April 28, 1964     W. H. ALPER ETAL     3,130,939
OBSTACLE CLEARING ATTACHMENT FOR AIR CUSHION VEHICLES
Filed Dec. 23, 1960
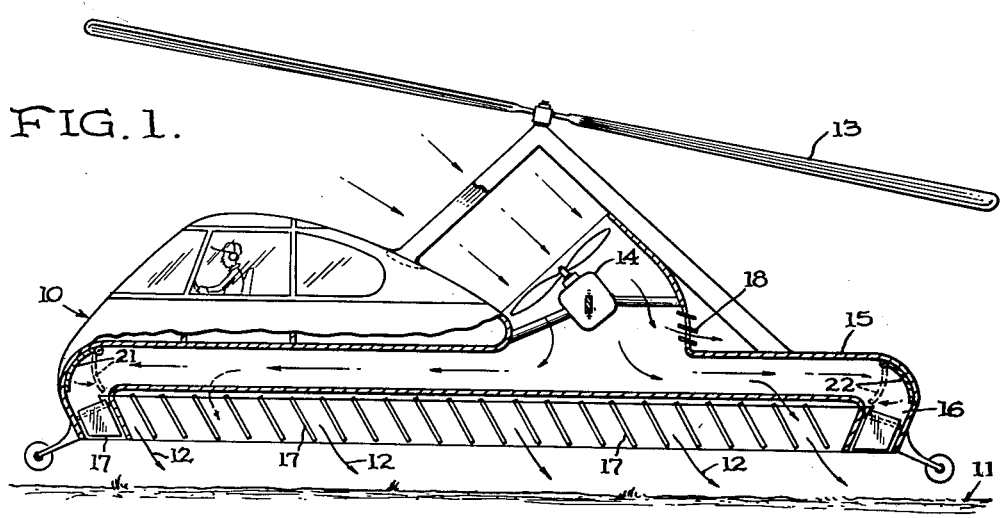
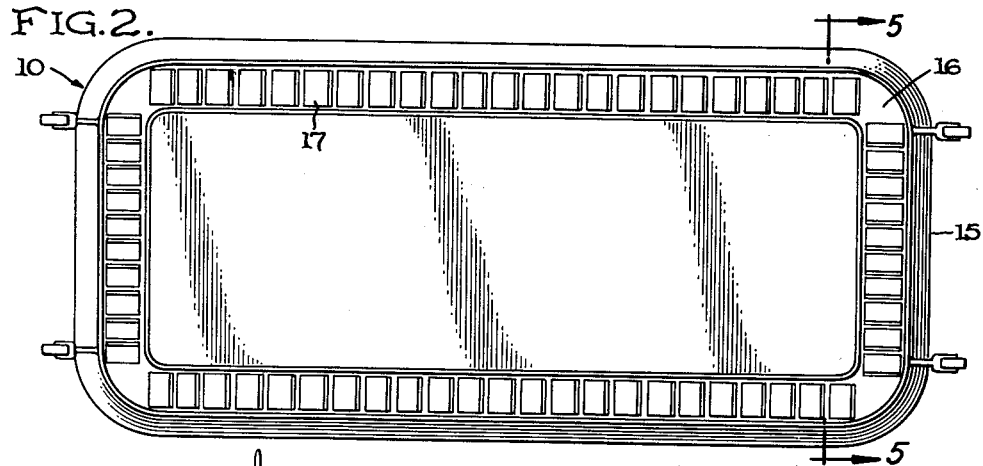
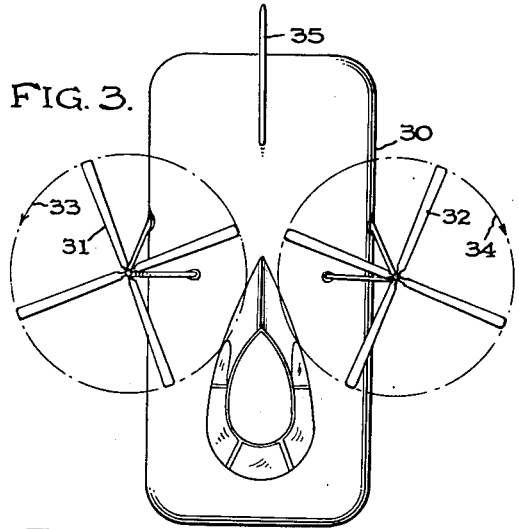
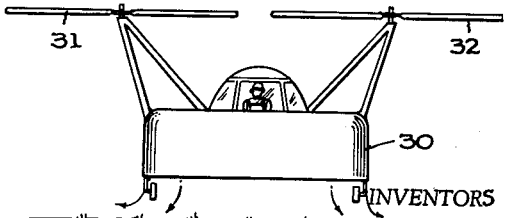
INVENTORS
WILLIAM H. ALPER
MELVILLE W. BEARDSLEY
BY
A. Fred Starobin
ATTORNEY

United States Patent Office 3,130,939
Patented Apr. 28, 1964

3,130,939
OBSTACLE CLEARING ATTACHMENT FOR AIR CUSHION VEHICLES
William H. Alper, Baltimore, and Melville W. Beardsley, Severna Park, Md., assignors, by mesne assignments, to The National Research Associates, Inc., Laurel, Md., a corporation of Maryland
Filed Dec. 23, 1960, Ser. No. 78,144
13 Claims. (Cl. 244—2)

The present invention relates to a surface vehicle adapted to pass over obstacles of substantial height.

Application No. 650,583 filed April 4, 1957, by Beardsley first disclosed a peripheral jet type of surface vehicle which has the ability to travel above a surface supported on a cushion of air maintained between the bottom of the vehicle and the surface over which it is traveling. This type of vehicle along with plenum chamber type vehicles are in a generic class of vehicles known as air cushion vehicles or minimum ground pressure vehicles. This generic class of vehicles also includes plenum type vehicles of the conformal flow species such as first disclosed in Beardsley Patent No. 3,039,550. Depending upon their weight, the power of their engines, and the area of their bases, they will be limited in lifting themselves to a height less than the distance across their width. Therefore, their travel may be obstructed if they encounter an obstacle reaching a greater height than that at which the vehicle ordinarily travels above the surface.

Accordingly, the present invention is directed to a means of allowing flight of minimum ground pressure vehicles, including any vehicle that has the ability to travel above the surface but in close proximity to it, to a height far enough above the surface to clear tall obstacles.

The invention also seeks to provide a means to carry the surface vehicle when out of ground proximity to heights where no ground effect is acting on the vehicle.

Basically, the present invention uses a rotor structure to allow the surface vehicle to rise to a substantial height with a lift independent of ground effect.

With the new arrangement it is also possible to achieve flight control through controlled variation of the air flow produced by the blowing system of an air cushion vehicle, whereas conventional autogyro flight as shown in prior art is controlled by the movement of horizontal and vertical surfaces exposed to the air flow due to forward motion.

A complete understanding of the invention may be had from the following description of a particular embodiment of the invention. In the description, reference is made to the accompanying drawings of which—

FIG. 1 shows a partially sectioned view of one type of vehicle incorporating the present invention;

FIG. 2 shows a bottom view of this type of vehicle;

FIG. 3 is a top plan view of another embodiment of the present invention;

FIG. 4 is a front elevational view of the vehicle of FIG. 3;

FIG. 5 is a partially sectioned elevational view along line 5—5 in FIG. 2.

Referring first to FIG. 1, there is illustrated a vehicle 10 suspended over a ground surface 11 by means of a peripheral air stream 12. It should be understood that such a vehicle may also operate by other air cushion means than that illustrated here and still remain in keeping with this invention. While vehicle 10 is hovering over a ground surface as shown in FIG. 1, free running rotor 13 does not operate. As illustrated in the figure, blower 14 draws air into the body shell 15, which air is then distributed and ejected through the bottom of body shell 15 around its periphery. Located in peripheral ducting 16 through which the air is ejected from body shell 15 are vanes 17 which are under the control of the operator of vehicle 10. The use of controls of this type on an air cushion vehicle with the structure therein has been explained in application No. 59,348 filed September 29, 1960, submitted by Melville W. Beardsley, where control of the turning motions and directional thrust were discussed.

Operation of vanes 17 and the additional thrust supplied when slats 18 are opened allowing the rearward ejection of part of the air stream created by blower 14 causes vehicle 10 to attain a forward speed thereby causing rotor 13 because of its inclination from the vertical to rotate from the stream of air passing through the blades. The rotation of rotor 13 creates an additional lifting force to act on vehicle 10.

The attitude of vehicle 10 can be controlled through the use of baffles 21 and 22 located in the fore and aft sections of the vehicle ducting 16 respectively. The baffles 21 and 22 are shown in their normally open position with a dashed outline showing them in their closed position. When either baffle 21 or 22 is closed thereby cutting off the air flow through the fore or aft part of ducting 16 respectively, the end with the closed baffle has a tendency to drop somewhat in relation to the opposite end of vehicle 10. One of the possible uses of this attitude control is when vehicle 10 is approaching an obstacle over which it must attempt to pass. The closing of rear baffle 22 will cause vehicle 10 to assume a nose up attitude thereby changing the angle of rotor 13 in relation to the air flow past the blades increasing its inclination from the vertical and thus increase the lift imparted to vehicle 10. The closing of baffle 22 will also divert the air from the rear ducting 16 to other areas of ducting 16 and also increase the amount of air flowing through slats 18. Through this diversion of the air flow there is an increase in nose up attitude and an additional forward thrust.

The baffles 23 and 24, shown in FIG. 5, in the sides of ducting 16 are operable in the same manner as baffles 21 and 22 in the fore and aft sections of ducting 16 and can be used advantageously to control the trim of vehicle 10 to compensate for unbalance in the loading of the vehicle, or any other forces requiring adjustment in the side trim of vehicle 10.

When the weight of the vehicle and its load, and the forward speed of the vehicle permit, rotor 13 will lift vehicle 10 away from the proximity of the ground surface 11 and allow attaining of heights such that the air cushion vehicle may pass over extremely tall structures. When this condition is attained the vanes 17 can be used to vary the direction and magnitude of air flow 12 thereby controlling the speed and attitude during various flight conditions.

FIG. 2 is a bottom view of the vehicle 10 of FIG. 1 and is included in order to show the possible shape of a vehicle used in this invention and the placement of vanes 17 in ducting 16.

More than one rotor may be used in cooperation with an air cushion vehicle in keeping with this invention. One such case where the rotors are placed side by side along a transverse axis of vehicle 10 is illustrated in FIGS. 3 and 4. In these figures air cushion vehicle body shell 30 has rotors 31 and 32 attached thereto by tripod stands. The direction of rotation of rotors so placed is shown by arrows 33 and 34 for rotors 31 and 32, respectively. Rotors may also be placed along the longitudinal axis of the vehicle and in other configurations or groupings not shown here. A stabilizing rudder 35 shown in the view in FIG. 3 may be used in some forms of air cushion vehicles which lack directional control by means of net turning movements produced by diverting the flow of air or by diverting a jet sheet.

It should be noted that this invention differs from prior art autogyros in many respects. A substantial portion of the total lifting force is provided by the flowing system of the air cushion vehicle. Thus the rotor provides only part of the lift in contrast to the entire lift in any of the prior art autogyros, and thereby a smaller rotor is required for this new vehicle.

Also, the air flow provided by the blowing system of the air cushion vehicle body is essentially downward in direction as compared with the horizontal rearward direction of air flow provided by the propeller of the autogyros found in the prior art.

Although a free running rotor is described in the embodiments shown, this invention also has effective use with a driven blade, in combination with a minimum ground pressure vehicle. In such a case the blade can be of a simple construction in view of the fact that a large part of the lift and the attitude control is supplied by the blowing system and general construction of the minimum ground pressure vehicle.

It will thus be apparent that this new concept using the novel combination will be highly advantageous in broadening the scope of operation of air cushion vehicles by endowing them with the ability to rise above tall obstacles and operate out of ground proximity.

From the foregoing, varied application of the novel aspects of the invention will occur to those skilled in the art, and variations in matters of detail will be apparent; and therefore it is appropriate that the appended claims be accorded a latitude of interpretation, consistent with the spirit and scope of the invention.

What is claimed is:

1. In combination, a surface vehicle of the minimum ground pressure type and an unshrouded free spinning rotor attached to said surface vehicle, said rotor having an axis of rotation inclined from the vertical whereby said surface vehicle is enabled to leave the proximity of the ground surface and rise to substantial heights.

2. A vehicle in accordance with claim 1, further characterized by said surface vehicle including a body shell and a blowing system contained in said body shell, said body shell having a variable louvre facing toward the rear of said body shell and ejecting air from said blowing system whereby the forward speed of the vehicle is varied.

3. A vehicle in accordance with claim 1, further characterized by said surface vehicle including a body shell and a blowing system contained in said body shell, movable vanes to control the direction of air flow from said body shell and baffle control means in said body shell to control the pitch attitude of said body shell.

4. The vehicle of claim 3, further characterized by baffle control means in the sides of said body shell to control the roll motion of said body shell.

5. A vehicle in accordance with claim 1, further characterized by said surface vehicle including a body shell, a blowing system contained in said body shell, means for directing flow from said blowing system downwards, means for directing flow from said blowing system rearward, and means for distributing the flow between the before mentioned means for directing the flow whereby flow to the rear may be increased as flow downwards is decreased.

6. In combination, a surface vehicle of the minimum ground pressure type, an unshrouded free spinning rotor attached to said surface vehicle, means for discharging a flow of air downwardly from said body including a means for fore and aft control of the horizontal component of air flow, said rotor having an axis of rotation inclined from the vertical whereby said surface vehicle is enabled to leave the proximity of the ground surface and rise to substantial heights.

7. In combination, a surface vehicle of the minimum ground pressure type, an unshrouded free spinning rotor attached to said surface vehicle, means for discharging a flow of air downwardly from said body including means to control the roll of said vehicle, said rotor having an axis of rotation inclined from the vertical whereby said surface vehicle is enabled to leave the proximity of the ground surface and rise to substantial heights.

8. In combination, a surface vehicle of the minimum ground pressure type, an unshrouded free spinning rotor attached to said surface vehicle, means for discharging a flow of air from said vehicle in a variable direction, said rotor having an axis of rotation inclined from the vertical whereby the motion of said vehicle is controlled when operating out of ground proximity.

9. In combination, a surface vehicle of the minimum ground pressure type, an unshrouded free spinning rotor attached to said surface vehicle, means for discharging a flow of air from said vehicle at a controllable rate, said rotor having an axis of rotation inclined from the vertical whereby the motion of said vehicle is controlled when operating out of ground proximity.

10. In combination, a surface vehicle of the minimum ground pressure type including means to blow a jet sheet of fluid downwardly from said vehicle and a plurality of free spinning rotors attached to said vehicle, said rotors having axes of rotation inclined from the vertical whereby the attitude during forward motion of said vehicle determined by the means to blow a jet sheet of fluid downwardly from said vehicle imparts an additional lifting force to said vehicle.

11. A vehicle of the minimum ground pressure type comprising a body shell, an unshrouded free spinning rotor attached to said body shell, said rotor having an axis of rotation inclined from the vertical, means to discharge air downwardly from said body shell adjacent to the periphery of said body shell, movable vanes to control the direction of air flow from the periphery of said body shell and baffle control means in said body shell to control the pitch attitude of said body shell, whereby said rotor imparts a lifting force to said body shell in cooperation with said movable vanes giving said body shell a forward motion while said baffle control means cause said body shell to assume a controlled pitch attitude.

12. The vehicle of claim 11, further characterized by baffle control means in the sides of said body shell to control the roll motion of said body shell.

13. The vehicle of claim 11, further characterized by a variable area port facing rearward, whereby said body shell is imparted additional forward motion enabling additional lifting force by said rotor.

References Cited in the file of this patent

UNITED STATES PATENTS

| | | |
|---|---|---|
| 1,997,600 | Pitcairn | Apr. 16, 1935 |
| 2,110,443 | Larsen et al. | Mar. 8, 1939 |
| 2,110,563 | Thaon | Mar. 8, 1938 |
| 2,387,627 | Warner | Oct. 23, 1945 |
| 2,514,822 | Wolfe | July 11, 1950 |
| 2,968,543 | Bright | Jan. 17, 1961 |
| 2,969,937 | Trojahn | Jan. 31, 1961 |
| 3,029,042 | Martin | Apr. 10, 1962 |
| 3,045,951 | Freeland | July 24, 1962 |

FOREIGN PATENTS

| | | |
|---|---|---|
| 219,133 | Australia | Nov. 24, 1958 |

OTHER REFERENCES

Boats, "The Gyro-Boat: The Latest Fashion in Ski Hooks," Jack Davitt, pages 24, 25, 60, 61, 63, VM320. M62, May 1957.

Design News, May 23, 1960, pp. 6–7.

Aviation Week, vol. 69, No. 9, Sept. 1, 1958, p. 59.